United States Patent
Mishima et al.

(10) Patent No.: US 12,545,360 B2
(45) Date of Patent: Feb. 10, 2026

(54) HUMAN-POWERED VEHICLE DRIVING DEVICE AND BATTERY HOLDING DEVICE

(71) Applicant: Shimano Inc., Osaka (JP)

(72) Inventors: Eiji Mishima, Osaka (JP); Norikazu Taki, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/396,133

(22) Filed: Dec. 26, 2023

(65) Prior Publication Data
US 2024/0124093 A1 Apr. 18, 2024

Related U.S. Application Data

(62) Division of application No. 16/288,516, filed on Feb. 28, 2019, now Pat. No. 11,897,580.

(30) Foreign Application Priority Data

Mar. 9, 2018 (JP) .................... 2018-043269

(51) Int. Cl.
| | | |
|---|---|---|
| *B62M 6/55* | (2010.01) | |
| *B60L 50/20* | (2019.01) | |
| *B62M 6/45* | (2010.01) | |
| *B62M 6/90* | (2010.01) | |

(52) U.S. Cl.
CPC .............. *B62M 6/55* (2013.01); *B60L 50/20* (2019.02); *B62M 6/45* (2013.01); *B62M 6/90* (2013.01); *B60L 2200/12* (2013.01)

(58) Field of Classification Search
CPC .. B60L 50/20; B60L 2200/12; B60L 2200/20; B62M 6/90; B62J 43/00; B62J 43/10; B62J 43/13; B62J 43/16; B62J 43/20; H01M 50/202; H01M 50/244; H01M 50/284; H01M 50/287
USPC ...................................... 180/207.3
See application file for complete search history.

(56) References Cited

U.S. PATENT DOCUMENTS

| | | | |
|---|---|---|---|
| 6,015,021 A | 1/2000 | Tanaka et al. | |
| 9,302,735 B2* | 4/2016 | Tagaya | B62M 6/90 |
| 9,463,845 B2 | 10/2016 | Kuroda et al. | |
| 9,502,702 B2* | 11/2016 | Nishihara | H01M 50/209 |
| 10,363,980 B2 | 7/2019 | Miles | |
| 11,897,580 B2* | 2/2024 | Mishima | B62M 6/55 |

(Continued)

FOREIGN PATENT DOCUMENTS

| | | |
|---|---|---|
| CN | 105667701 A | 6/2016 |
| CN | 106809335 A | 6/2017 |

(Continued)

OTHER PUBLICATIONS

English translation of WO2020/057808 (filed Sep. 17, 2018) (Year: 2020).*

*Primary Examiner* — Anne Marie M Boehler
(74) *Attorney, Agent, or Firm* — Spencer Fane, LLP

(57) ABSTRACT

A battery holding device includes a battery holder and a second wireless communication unit. The battery holder is configured to be mountable on a human-powered vehicle. The battery holder includes a battery connector connected to a battery. The second wireless communication unit is provided on the battery holder. The battery connector is removably connected to the battery. The second wireless communication unit is removably attached to the battery holder.

20 Claims, 5 Drawing Sheets

(56) References Cited

U.S. PATENT DOCUMENTS

| | | | |
|---|---|---|---|
| 2012/0253601 A1 | 10/2012 | Ichida et al. | |
| 2015/0009019 A1 | 1/2015 | Watarai et al. | |
| 2015/0352973 A1 | 12/2015 | Gao | |
| 2016/0243927 A1 | 8/2016 | Biderman et al. | |
| 2016/0280300 A1* | 9/2016 | Latzke | B62J 6/12 |
| 2016/0339992 A1 | 11/2016 | Yoshiie et al. | |
| 2017/0029057 A1 | 2/2017 | Kato et al. | |
| 2018/0056812 A1 | 3/2018 | Hamann | |
| 2018/0229803 A1* | 8/2018 | Wesling | B62M 9/132 |
| 2018/0345821 A1* | 12/2018 | Lee | B60L 15/20 |
| 2019/0002053 A1* | 1/2019 | Kakinoki | B62K 19/40 |
| 2019/0300104 A1 | 10/2019 | Saruwatari | |
| 2020/0148298 A1 | 5/2020 | Hara | |
| 2020/0207216 A1 | 7/2020 | Hasumi | |
| 2021/0016854 A1 | 1/2021 | Thompson et al. | |

FOREIGN PATENT DOCUMENTS

| | | | | |
|---|---|---|---|---|
| CN | 107074118 A | * | 8/2017 | B60K 6/28 |
| EP | 3 266 693 A1 | | 1/2018 | |
| JP | 8-268361 A | | 10/1996 | |
| JP | 3156753 U | | 12/2009 | |
| JP | 2015-27861 A | | 2/2015 | |
| WO | 2015/108069 A1 | | 7/2015 | |
| WO | 2016/139693 A1 | | 9/2016 | |
| WO | WO-2018084357 A1 | * | 5/2018 | B60R 25/33 |
| WO | WO-2020057808 A1 | * | 3/2020 | H01M 50/249 |

\* cited by examiner

HUMAN-POWERED VEHICLE DRIVING DEVICE AND BATTERY HOLDING DEVICE

CROSS-REFERENCE TO RELATED APPLICATIONS

This application is a divisional application of U.S. application Ser. No. 16/288,516, filed on Feb. 28, 2019, and claims priority to U.S. application Ser. No. 16/288,516 under 35 U.S.C. § 120. The entire disclosure of U.S. application Ser. No. 16/288,516 is hereby incorporated herein by reference. This application claims priority to Japanese Patent Application No. 2018-043269, filed on Mar. 9, 2018. The entire disclosure of Japanese Patent Application No. 2018-043269 is hereby incorporated herein by reference.

BACKGROUND

Technical Field

The present invention generally relates to a battery holding device for a human-powered vehicle.

Background Information

A known human-powered vehicle driving device is mounted on a human-powered vehicle. A conventional human-powered vehicle driving device includes a motor that assists in the propulsion of a human-powered vehicle and a base that accommodates the motor. Japanese Laid-Open Patent Publication No. 2017-30395 (Patent document 1) discloses an example of a conventional human-powered vehicle driving device.

SUMMARY

It is desirable that the functionality of a human-powered vehicle driving device be improved. This desire is directed in an exemplary manner toward a human-powered vehicle driving device mounted on a human-powered vehicle but can also be directed to other elements mounted on the human-powered vehicle.

It is an object of the present disclosure to provide a battery holding device that improve functionality.

A human-powered vehicle driving device in accordance with a first aspect of the present disclosure comprises a motor that assists in propulsion of a human-powered vehicle and a first electric switch including an operation member.

In accordance with the human-powered vehicle driving device according to the first aspect, the mounting of the first electric switch improves functionality.

In accordance with a second aspect of the present disclosure, in the human-powered vehicle driving device according to the first aspect, the first electric switch is configured to output an electric signal for changing a control state of the motor.

In accordance with the human-powered vehicle driving device according to the second aspect, functionality is improved. Furthermore, the distance between the first electric switch and the motor is short. Thus, in a case where the electric wire is used for connecting the first electric switch and the motor, the electric wire can be shortened.

In accordance with a third aspect of the present disclosure, in the human-powered vehicle driving device according to the first or second aspect, the first electric switch further includes a positioning member including a first recess configured to receive at least part of the operation member.

In accordance with the human-powered vehicle driving device according to the third aspect, the operation member can be positioned appropriately.

In accordance with a fourth aspect of the present disclosure, the human-powered vehicle driving device according to any one of first to third aspects further comprises a base provided with at least one of the motor and a reduction gear.

In accordance with the human-powered vehicle driving device according to the fourth aspect, in a case where at least one of the motor and the reduction gear is provided on the base, at least one of the motor and the reduction gear can be protected by the base.

In accordance with a fifth aspect of the present disclosure, the human-powered vehicle driving device according to the fourth aspect is configured so that the first electric switch is provided on the base, and at least part of the operation member is exposed to an outer side of the base.

In accordance with the human-powered vehicle driving device according to the fifth aspect, the operability of the operation member is improved.

In accordance with a sixth aspect of the present disclosure, the human-powered vehicle driving device according to the fourth or fifth aspect is configured so that the operation member is provided on a peripheral portion of the base.

In accordance with the human-powered vehicle driving device according to the sixth aspect, the operability of the operation member is improved.

In accordance with a seventh aspect of the present disclosure, the human-powered vehicle driving device according to any one of the fourth to sixth aspects is configured so that the first electric switch is integrated with the base.

In accordance with the human-powered vehicle driving device according to the seventh aspect, the number of parts of the human-powered vehicle driving device can be reduced.

In accordance with an eighth aspect of the present disclosure, the human-powered vehicle driving device according to any one of the fourth to sixth aspects is configured so that the base includes a first mounting portion allowing for mounting of the first electric switch.

In accordance with the human-powered vehicle driving device according to the eighth aspect, the first electric switch can be appropriately mounted on the base.

In accordance with a ninth aspect of the present disclosure, the human-powered vehicle driving device according to any one of the fourth to eighth aspects further comprises a first wireless communication unit provided on the base.

In accordance with the human-powered vehicle driving device according to the ninth aspect, the mounting of the first wireless communication unit improves functionality.

In accordance with a tenth aspect of the present disclosure, in the human-powered vehicle driving device according to the ninth aspect, the first electric switch is configured to output an electric signal and the first wireless communication unit is configured to perform wireless communication in response to the electric signal outputted by the first electric switch.

In accordance with the human-powered vehicle driving device according to the tenth aspect, this can contribute to improvement in functionality. Furthermore, the distance between the first electric switch and the first wireless communication unit is short. Thus, in a case where the electric wire is used for connecting the first electric switch and the first wireless communication unit, the electric wire can be shortened.

In accordance with an eleventh aspect of the present disclosure, the human-powered vehicle driving device according to the ninth or tenth aspect is configured so that the base includes a second mounting portion that mounts the first wireless communication unit.

In accordance with the human-powered vehicle driving device according to the eleventh aspect, the first wireless communication unit can be appropriately mounted on the base.

In accordance with a twelfth aspect of the present disclosure, the human-powered vehicle driving device according to any one of the first to eleventh aspects further comprises a first controller electrically connected to the first electric switch and configured to control the motor. Upon operation of the operation member of the first electric switch, an electric signal from the first electric switch is outputted to the first controller to activate the first controller.

In accordance with the human-powered vehicle driving device according to the twelfth aspect, the mounting of the first controller improves functionality.

A battery holding device in accordance with a thirteenth aspect of the present disclosure comprises a battery holder and a second wireless communication unit. The battery holder is configured to be mountable on a human-powered vehicle and includes a battery connector connected to a battery. The second wireless communication unit is provided on the battery holder. The battery connector is removably connected to the battery, and the second wireless communication unit is removably attached to the battery holder.

In accordance with the battery holding device according to the thirteenth aspect, the mounting of the second wireless communication unit improves functionality.

In accordance with a fourteenth aspect of the present disclosure, the battery holding device according to the thirteenth aspect is configured so that the battery connector includes an electric terminal electrically connected to the battery.

In accordance with the battery holding device according to the fourteenth aspect, the battery and the battery connector can be electrically connected.

In accordance with a fifteenth aspect of the present disclosure, the battery holding device according to the thirteenth or fourteenth aspect is configured so that the battery holder is one of a plurality of battery holders, and the second wireless communication unit is provided on at least one of the plurality of battery holders.

In accordance with the battery holding device according to the fifteenth aspect, functionality is improved.

In accordance with a sixteenth aspect of the present disclosure, the battery holding device according to the fifteenth aspect is configured so that the battery includes a first end and a second end differing from the first end, and the plurality of battery holders include a first battery holder connected to at least part of the first end of the battery and a second battery holder connected to at least part of the second end of the battery.

In accordance with the battery holding device according to the sixteenth aspect, the battery can be appropriately held by the plurality of battery holders.

In accordance with a seventeenth aspect of the present disclosure, the battery holding device according to any one of the thirteenth to sixteenth aspects is configured so that at least part of the second wireless communication unit is embedded in the battery holder.

In accordance with the battery holding device according to the seventeenth aspect, at least part of the second wireless communication unit can be protected by the battery holder.

In accordance with an eighteenth aspect of the present disclosure, in the battery holding device according to any one of the thirteenth to seventeenth aspects, the battery holder further includes a second recess configured to receive at least part of the second wireless communication unit.

In accordance with the battery holding device according to the eighteenth aspect, the second wireless communication unit can be appropriately arranged in the battery holder.

In accordance with a nineteenth aspect of the present disclosure, the battery holding device according to the eighteenth aspect is configured so that the second recess includes a through hole.

In accordance with the battery holding device according to the nineteenth aspect, the second wireless communication unit can be appropriately arranged in the battery holder.

In accordance with a twentieth aspect of the present disclosure, the battery holding device according to any one of the thirteenth to seventeenth aspects is configured so that the battery holder further includes an accommodation cavity therein, and the second wireless communication unit is arranged in the accommodation cavity.

In accordance with the battery holding device according to the twentieth aspect, the second wireless communication unit can be appropriately arranged in the battery holder.

In accordance with a twenty-first aspect of the present disclosure, the battery holding device according to any one of the thirteenth to twentieth aspects is configured so that the second wireless communication unit is configured to perform wireless communication with a third wireless communication unit provided on at least one of an operation device installed on the human-powered vehicle and an external device.

In accordance with the battery holding device according to the twenty-first aspect, the electric wire electrically connecting at least one of the operation devices and the external device to the second wireless communication unit can be omitted.

In accordance with a twenty-second aspect of the present disclosure, the battery holding device according to any one of the thirteenth to twenty-first aspects further comprises a lock mechanism provided on the battery holder and that restricts relative positions of the battery and the battery holder in a state in which the battery is connected to the battery connector.

In accordance with the battery holding device according to the twenty-second aspect, the relative positions of the battery and the battery holder can be restricted by the lock mechanism.

In accordance with a twenty-third aspect of the present disclosure, the battery holding device according to the twenty-second aspect is configured so that the lock mechanism includes a keyhole that is configured to receive a key that is operated to cancel the restriction on the relative positions of the battery and the battery holder.

In accordance with the battery holding device according to the twenty-third aspect, the restriction on the relative positions of the battery and the battery holder can be easily canceled.

In accordance with a twenty-fourth aspect of the present disclosure, the battery holding device according to any one of the thirteenth to twenty-third aspects further comprises a second electric switch provided on the battery holder to feed a second controller that controls a component installed on the human-powered vehicle with an electric signal for activating the second controller.

In accordance with the battery holding device according to the twenty-fourth aspect, the mounting of the second electric switch portion improves functionality. Furthermore, the distance between the second electric switch and the second controller is short. Thus, in a case where the electric wire is used for connecting the second electric switch and the second controller, the electric wire can be shortened.

In accordance with a twenty-fifth aspect of the present disclosure, the battery holding device according to any one of the thirteenth to twenty-fourth aspects is configured so that the battery outputs power to drive a motor that assists in propulsion of the human-powered vehicle.

In accordance with the battery holding device according to the twenty-fifth aspect, the distance between the motor and the battery is short. Thus, in a case where the electric wire is used for connecting the motor and the battery, the electric wire can be shortened.

A battery holding device in accordance with a twenty-sixth aspect of the present disclosure comprises a battery holder and a second wireless communication unit. The battery holder includes a battery connector connected to a battery, the battery holder is configured to be mountable on a human-powered vehicle. The second wireless communication unit is provided on the battery holder. The battery is configured to output power to drive a motor that assists in propulsion of the human-powered vehicle.

In accordance with the battery holding device according to the twenty-sixth aspect, the mounting of the second wireless communication unit improves functionality.

A battery holding device in accordance with a twenty-seventh aspect of the present disclosure comprises a plurality of battery holders, which are configured to be mountable on a human-powered vehicle and include a battery connector connected to a battery, and a second wireless communication unit provided on the battery holder. The battery includes a first end and a second end that differs from the first end, and the plurality of battery holders include a first battery holder connected to at least part of the first end of the battery and a second battery holder connected to at least part of the second end of the battery.

In accordance with the battery holding device according to the twenty-seventh aspect, the mounting of the second wireless communication unit improves functionality.

In accordance with the human-powered vehicle driving device and the battery holding device according to the present disclosure, functionality is improved.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. In this disclosure, the phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

First Embodiment

Figure 1:
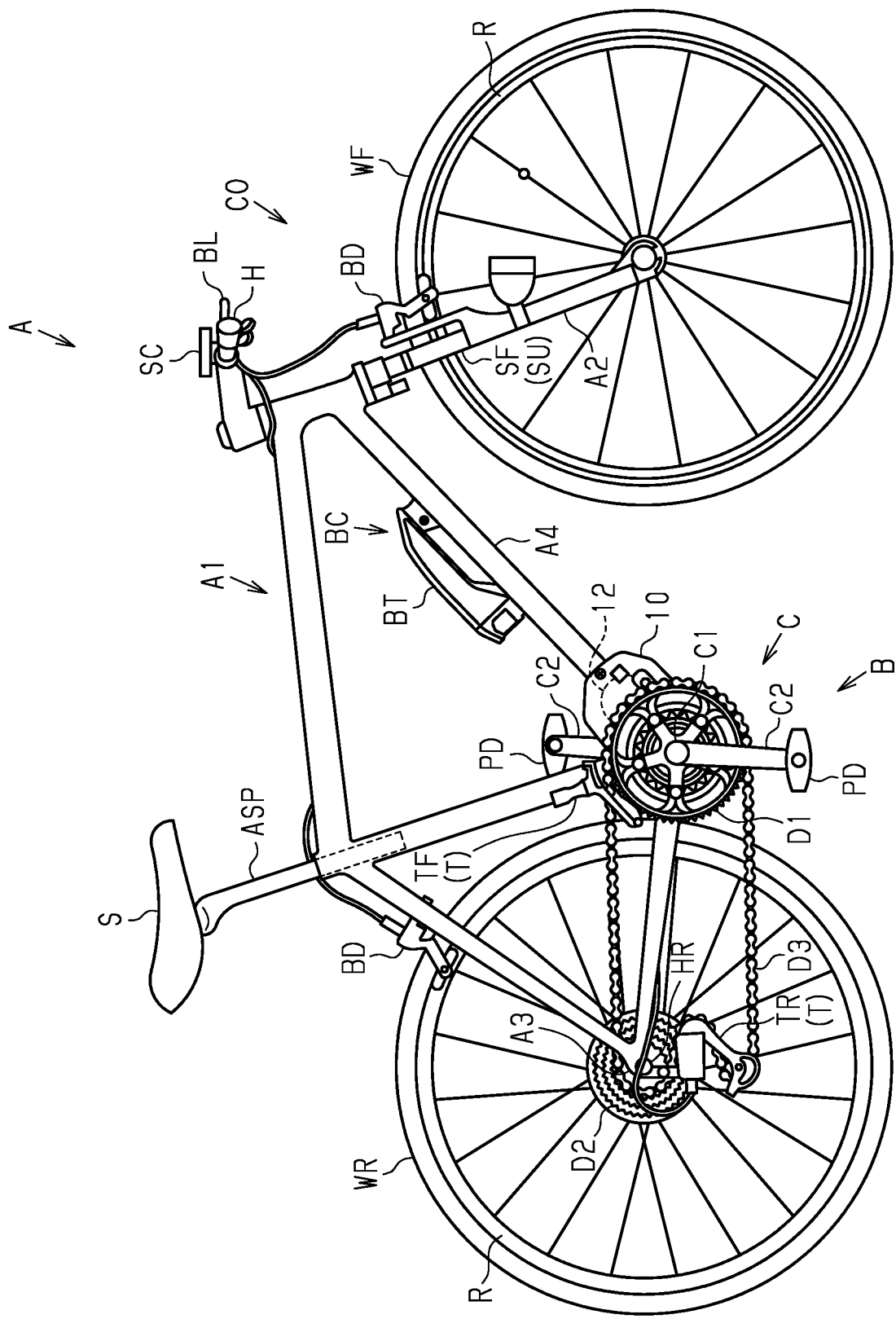
FIG. 1 is a side elevational view of a human-powered vehicle including a human-powered vehicle driving device in accordance with a first embodiment.

A human-powered vehicle A including a human-powered vehicle driving device 10 will now be described with reference to FIG. 1. Here, the human-powered vehicle refers to a vehicle that at least partially uses human force as a prime mover for traveling, and includes vehicles that assist human force with electric power. The human-powered vehicle does not include vehicles that use only a prime mover other than the human force. In particular, the human-powered vehicle does not include vehicles that use only an internal combustion engine as the prime mover. A typical human-powered vehicle is a compact light vehicle that does not require a license for driving on a public road. The illustrated human-powered vehicle A is a bicycle (e-bike) including the human-powered vehicle driving device 10 that assists in propulsion of the human-powered vehicle A by using electric energy. Specifically, the illustrated human-powered vehicle A is a trekking bike. The human-powered vehicle A further includes a frame A1, a front fork A2, a front wheel WF, a rear wheel WR, a handlebar H, and a drive train B.

The drive train B is of a chain drive type. The drive train B includes a crank C, a front sprocket D1, a rear sprocket D2, and a chain D3. The crank C includes a crankshaft C1 rotatably supported by the frame A1 and two crank arms C2 provided on two ends of the crankshaft C1. A pedal PD is rotatably attached to the distal end of each of the crank arms C2. The drive train B can be of any type such as a belt drive type or a shaft drive type.

The front sprocket D1 is provided on the crank C so as to rotate integrally with the crankshaft C1. The rear sprocket D2 is provided on a hub HR of the rear wheel WR. The chain D3 is wound around the front sprocket D1 and the rear sprocket D2. A user riding the human-powered vehicle A applies driving force (hereinafter referred to as "the human driving force") to the pedals PD that is transmitted to the rear wheel WR via the front sprocket D1, the chain D3, and the rear sprocket D2.

The human-powered vehicle A further includes a plurality of components CO. The plurality of components CO include at least one of the human-powered vehicle driving device 10, one of a pair of brake devices BD, a transmission T, a suspension SU, and an adjustable seatpost ASP. The human-powered vehicle driving device 10 includes a motor 12. The brake devices BD, the transmission T, the suspension SU, and the adjustable seatpost ASP may be mechanically or electrically driven in accordance with the operation of the corresponding operation device.

The number of the brake devices BD corresponds to the number of wheels. In the present embodiment, a first one of the brake devices BD is provided on the human-powered vehicle A for applying a braking force to the front wheel WF, and a second one of the brake devices BD is provided on the human-powered vehicle A for applying a braking force to the rear wheel WR. The brake devices BD have the same configuration. Each of the brake devices BD is, for example, a rim brake device that is configured to brake the rim R of the human-powered vehicle A. In one example, each of the brake devices BD is driven in accordance with the operation of a corresponding brake lever BL (operation device) provided on the handlebar H. One or both of the brake devices BD can be a disc brake device that is configured to brake a disc brake rotor (not shown) mounted on the human-powered vehicle A.

The transmission T includes at least one of a front derailleur TF and a rear derailleur TR. The front derailleur TF is provided in the vicinity of the front sprocket D1. The front derailleur TF is actuated to change the front sprocket D1 around which the chain D3 is wound thereby changing the transmission ratio of the human-powered vehicle A. The rear derailleur TR is provided on a rear end A3 of the frame A1. The rear derailleur TR is actuated to change the rear sprocket D2 around which the chain D3 is wound thereby changing the transmission ratio of the human-powered vehicle A. The transmission T can be an internal type of transmission such as an internal gear hub. The suspension SU includes at least one of a front suspension SF and a rear suspension (not shown). The front suspension SF functions to absorb impacts received by the front wheel WF from the ground. The rear suspension functions to absorb impacts received by the rear wheel WR from the ground. The adjustable seatpost ASP is actuated to change the height of a saddle S relative to the frame A1.

The human-powered vehicle A further includes a battery component BC that is configured to supply power to the electrical elements mounted on the human-powered vehicle A. The battery component BC is provided, for example, in a down tube A4 of the frame A1. The battery component BC includes a battery BT. An electrically driven element of the plurality of components CO operates by, for example, power supplied from the battery BT or power supplied from a dedicated power supply (not shown) mounted on the individual component CO.

Figure 2:
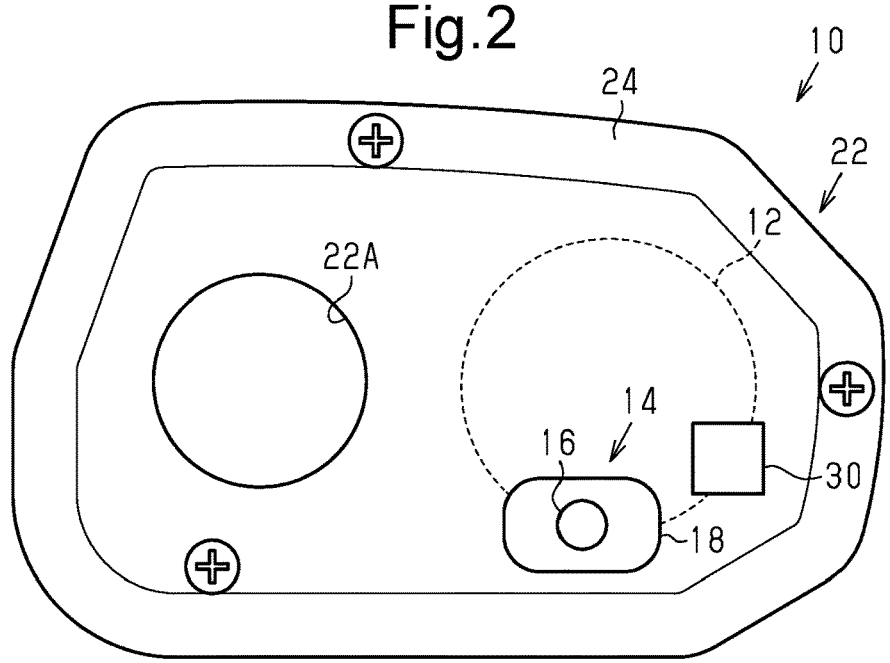
FIG. 2 is a side elevational view of the human-powered vehicle driving device illustrated in FIG. 1.

The configuration of the human-powered vehicle driving device 10 will now be described with reference to FIG. 2. The human-powered vehicle driving device 10 is provided on the frame A1 so as to be supported by, for example, the crankshaft C1 (refer to FIG. 1). The human-powered vehicle driving device 10 includes a motor 12 that assists in the propulsion of the human-powered vehicle A and a first electric switch 14 including an operation member 16. For example, the first electric switch 14 is not included in a remote control device. In one example, the first electric switch 14 is electrically connected to the motor 12 by an electric wire (not shown). The first electric switch 14 is configured to output an electric signal for changing the control state of the motor 12. The control state of the motor 12 changes, for example, at least one of an ON/OFF state related to driving of the motor 12 and the driving force of the motor 12 relative to the human driving force. In a case where the ON/OFF state related to the driving of the motor 12 is changed, the power supply of the human-powered vehicle driving device 10 is switched ON and OFF. The ON/OFF state relating to the driving of the motor 12 does not have to be associated with the ON/OFF of the power supply of the human-powered vehicle driving device 10. In a case where the driving force of the motor 12 relative to the human driving force is changed, the assist mode of the human-powered vehicle driving device 10 is changed. The driving force of the motor 12 is transmitted to the drive train B through, for example, a reduction gear 20 (refer to FIG. 4) and the like. In one example, the driving force of the motor 12 is transmitted to the crankshaft C1 or the front sprocket D1.

The human-powered vehicle driving device 10 further includes a base 22 provided with at least one of the motor 12 and the reduction gear 20. In one example, the base 22 is a housing that accommodates the motor 12 and the reduction gear 20. The base 22 can be formed together with the frame A1 as a one-piece component, formed integrally with the frame A1, or formed separately from the frame A1. The base 22 includes an inserting portion 22A allowing for insertion of the crankshaft C1 therethrough. The inserting portion 22A is a through hole that extends through a peripheral portion 24 of the base 22 in a widthwise direction of the human-powered vehicle A.

The first electric switch 14 is provided on the base 22. For example, the first electric switch 14 is provided on the base 22 like in a first example or a second example described below. In the first example, the base 22 includes a first mounting portion 26 (refer to FIG. 3) that mounts the first electric switch 14. That is, the first electric switch 14 is mounted on the first mounting portion 26 of the base 22. The first mounting portion 26 is provided on the peripheral portion 24 of the base 22. In the second example, the first electric switch 14 is integrated with the base 22. In the present embodiment, the first electric switch 14 is mounted on the first mounting portion 26 as described above in the first example.

At least part of the operation member 16 is exposed to an outer side of the base 22. The operation member 16 is provided on the peripheral portion 24 of the base 22. In one example, the first electric switch 14 is mounted on the first mounting portion 26 of the base 22 such that at least the manually operated portion of the operation member 16 is exposed to the outer side of the base 22. In the present embodiment, the operation member 16 is a pushbutton switch. The operation member 16 can be a different type of switch such as a slide switch or a rocker switch.

Figure 3:
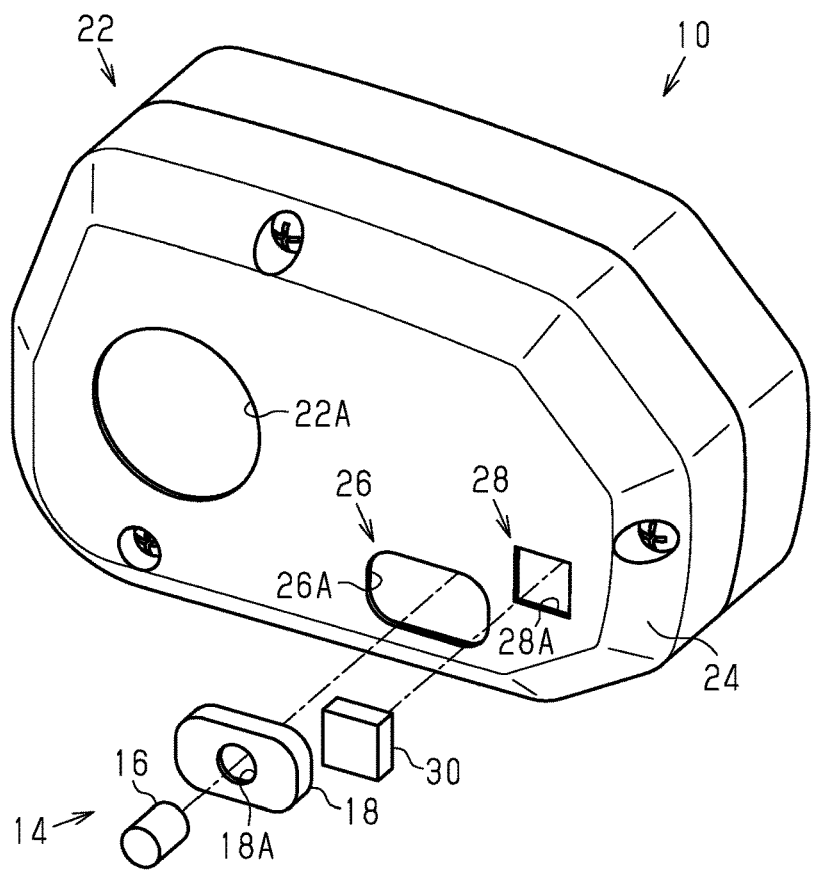
FIG. 3 is a partially exploded perspective view of the human-powered vehicle driving device illustrated in FIG. 2.

As shown in FIG. 3, the first electric switch 14 further includes a positioning member 18 having a first recess 18A configured to receive at least part of the operation member 16. The first mounting portion 26 includes, for example, a recess 26A, configured to receive the positioning member 18, and a coupling tool (not shown), used to couple the positioning member 18 to the recess 26A. The operation member 16 is arranged in the first recess 18A, and the positioning member 18 is coupled to the recess 26A with the coupling tool. This results in a state in which the first electric switch 14 is mounted on the first mounting portion 26. In the first mounting portion 26, the coupling tool may be omitted in a case where the positioning member 18 is coupled to the recess 26A through engagement of the positioning member 18 and the recess 26A. In a state in which the first electric switch 14 is mounted on the first mounting portion 26, the operation member 16 is electrically connected to a first controller 32 (refer to FIG. 4), which will be described later.

The human-powered vehicle driving device 10 further includes a first wireless communication unit 30 that is provided on the base 22 and that is configured to transmit or receive a wireless signal. The term "wireless communication unit" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the bicycle field. Here, the first wireless communication unit 30 is a transceiver, but in certain applications can be a one-way wireless communication device such as a transmitter. The first wireless communication unit 30 can be removably attached to the base 22 or irremovably attached to the base 22. In an example in which the first wireless communication unit 30 is removably attached to the base 22, the attachment/removal of the first wireless communication unit 30 can be repeated since the base 22 will practically not be damaged in a case where the first wireless communication unit 30 is removed from the base 22. Therefore, the first wireless communication unit 30 can easily be replaced when it fails to function properly.

The first wireless communication unit 30 is provided on the base 22, for example, like in any one of third to fifth examples described below. In the third example, the base 22 includes a second mounting portion 28 that mounts the first wireless communication unit 30. That is, the first wireless communication unit 30 is mounted on the second mounting portion 28 of the base 22. The second mounting portion 28 is provided on the peripheral portion 24 of the base 22. In the fourth example, the first wireless communication unit 30 is integrated with the base 22. In the fifth example, the first wireless communication unit 30 is embedded in the base 22 so as to be positioned in a cavity inside the base 22. In the present embodiment, the first wireless communication unit 30 is mounted on the second mounting portion 28 as described in the third example. The first electric switch 14 and the first wireless communication unit 30 can be provided as a single unit on the base 22.

The first wireless communication unit 30 is mounted on the second mounting portion 28 of the base 22, for example, to be at least partially exposed to an outer side of the base 22. The second mounting portion 28 includes, for example, a recess 28A, that is configured to receive the first wireless communication unit 30, and a coupling tool (not shown), that is used to couple the first wireless communication unit 30 to the recess 28A. The first wireless communication unit 30 is coupled to the recess 28A with the coupling tool. This results in a state in which the first wireless communication unit 30 is mounted on the second mounting portion 28. In the second mounting portion 28, the coupling tool may be omitted in a case where the first wireless communication unit 30 is mounted on the recess 28A through engagement of the first wireless communication unit 30 with the recess 28A. In a state in which the first wireless communication unit 30 is mounted on the second mounting portion 28, the first wireless communication unit 30 is electrically connected to the first controller 32, which will be described later.

Figure 4:
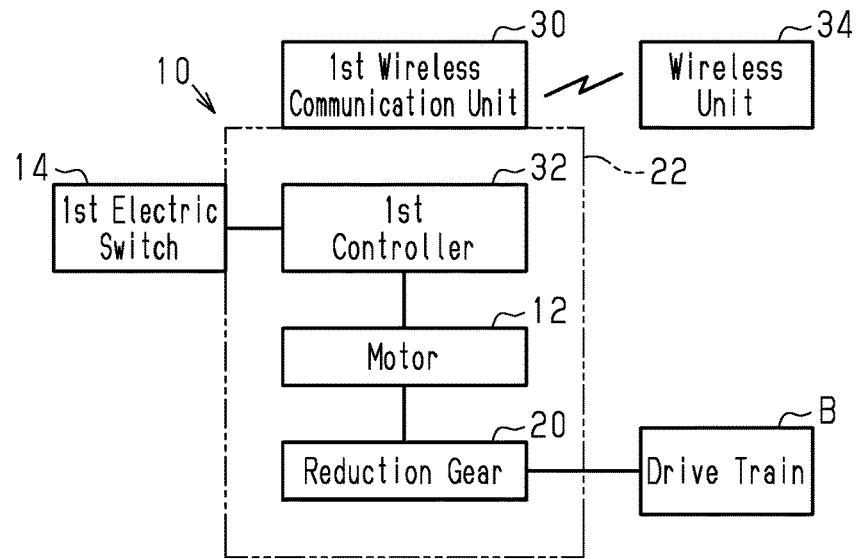
FIG. 4 is a block diagram showing the connection of the human-powered vehicle driving device illustrated in FIG. 2 with various elements.

As shown in FIG. 4, the human-powered vehicle driving device 10 further includes the first controller 32 electrically connected to the first electric switch 14 and configured to control the motor 12. The first controller 32 is a central processing unit (CPU) or a micro-processing unit (MPU). Preferably, the first controller 32 includes one or more processors and one or more storage devices. The term "controller" as used herein refers to hardware that executes a software program. The memory device stores programs used by the first controller 32. The memory device is any computer storage device or any computer readable medium with the sole exception of a transitory, propagating signal. For example, the memory device can be nonvolatile memory and volatile memory, and can includes a ROM (Read Only Memory) device, a RAM (Random Access Memory) device, a hard disk, a flash drive, etc. The first controller 32 is, for example, accommodated in the base 22. The operation member 16 is operated to send an electric signal from the first electric switch 14 to the first controller 32 and activate the first controller 32. In one example, the first controller 32 controls the motor 12 to change the control state of the motor 12 in accordance with an electric signal based on the operation of the operation member 16.

The first electric switch 14 is configured to output an electric signal for performing wireless communication to the first wireless communication unit 30. In other words, upon operation of the operation member 16 of the first electric switch 14, the first electric switch 14 outputs an electric signal, and the first wireless communication unit 30 performs wireless communication in response to the electric signal outputted by the first electric switch 14. The first wireless communication unit 30 is configured to, for example, perform wireless communication with a wireless unit 34, which includes a wireless communicator (not shown) configured to transmit or receive a wireless signal, in accordance with the operation of the first electric switch 14. The wireless unit 34 includes at least one of, for example, the brake devices BD, the transmission T, the suspension SU, the adjustable seatpost ASP, a cycle computer SC (refer to FIG. 1), and an external device (not shown).

The first electric switch 14, for example, outputs an electric signal to the first controller 32 to change the control state of the motor 12 in accordance with a first operation of the operation member 16 and outputs an electric signal to the first controller 32 so that the first wireless communication unit 30 performs wireless communication in accordance with a second operation of the operation member 16. In a case where an electric signal is acquired based on the first operation of the operation member 16, the first controller 32 controls the motor 12 to change the control state of the motor 12. In a case where an electric signal is acquired based on the second operation of the operation member 16, the first controller 32 transmits a wireless signal from the first wireless communication unit 30 to the wireless unit 34 to control the wireless unit 34. The first wireless communication unit 30 can be configured to receive a wireless signal transmitted from the wireless unit 34.

Second Embodiment

The battery component 40 of the second embodiment will now be described with reference to FIGS. 5 to 7. Same reference numerals are given to those components that are the same as the corresponding components of the first embodiment. Such components will not be described in detail.

Figure 5:
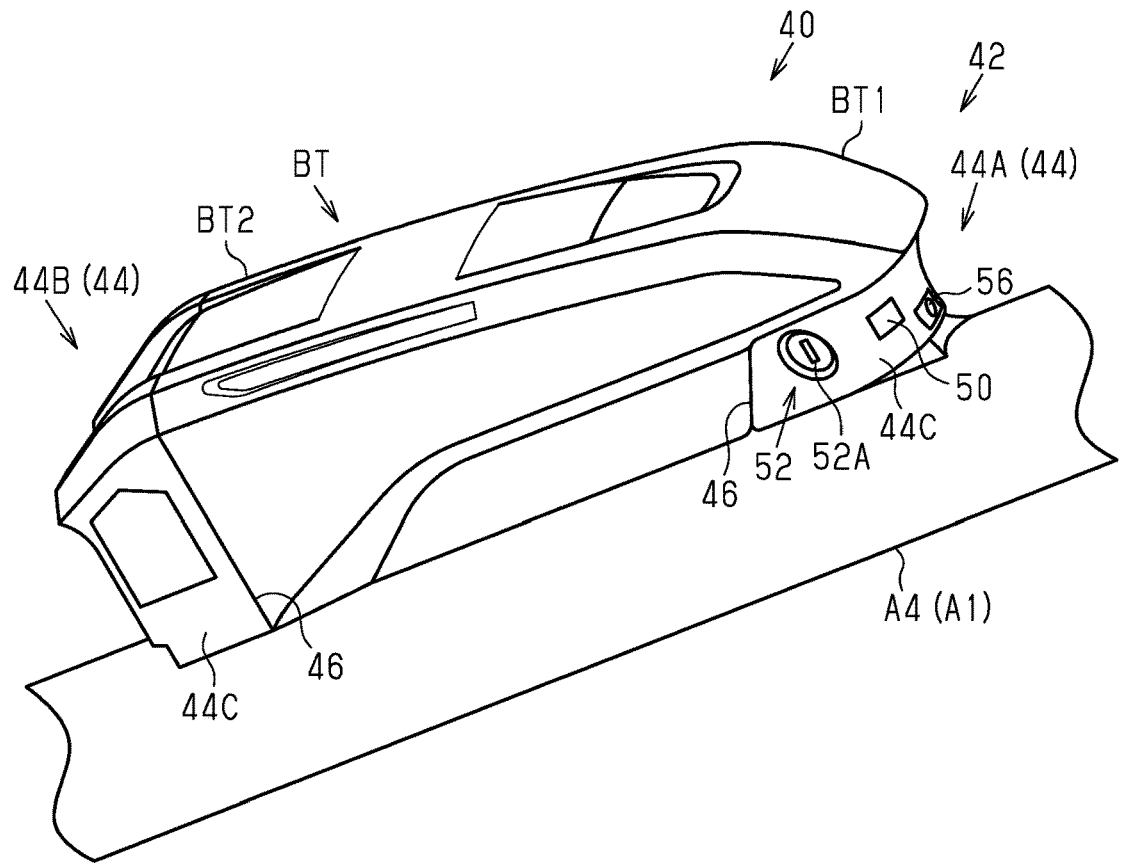
FIG. 5 is a perspective view of a battery component including a battery holding device in accordance with a second embodiment.

As shown in FIG. 5, the human-powered vehicle A includes a battery component 40 configured to supply power to the electrical elements mounted on the human-powered vehicle A. The battery component 40 is provided, for example, on the down tube A4 of the frame A1. The battery component 40 includes a battery BT and a battery holding device 42 configured to hold the battery BT. The battery BT outputs power to drive the motor 12 that assists in propulsion of the human-powered vehicle A. At least one of the first electric switch 14, the first wireless communication unit 30, and the first controller 32 may be omitted from the human-powered vehicle driving device 10 of the second embodiment.

The battery holding device 42 includes a battery holder 44 and a second wireless communication unit 50. The holder 44 is configured to be mountable on the human-powered vehicle A and includes a battery connector 46 connected to the battery BT. The second wireless communication unit 50 is provided on the battery holder 44. The battery holder 44 is fixed to, for example, the down tube A4 of the human-powered vehicle A. The battery connector 46 is provided, for example, on a portion of the battery holder 44 facing the battery BT. The battery BT is removably connected to the battery connector 46.

The battery holding device 42 includes a plurality of battery holders 44. The battery BT includes a first end BT1 and a second end BT2 that differs from the first end BT1. The plurality of battery holders 44 include a first battery holder 44A connected to at least part of the first end BT1 of the battery BT and a second battery holder 44B connected to at least part of the second end BT2 of the battery BT. For example, the first battery holder 44A is provided toward the front of the human-powered vehicle A on the down tube A4 of the human-powered vehicle A. For example, the second battery holder 44B is provided toward the rear of the human-powered vehicle A on the down tube A4 of the human-powered vehicle A. The first battery holder 44A can be provided toward the rear of the human-powered vehicle A, and the second battery holder 44B can be provided toward the front of the human-powered vehicle A.

The battery connector 46 includes an electric terminal 46A (refer to FIG. 6) electrically connected to the battery BT. Specifically, the electric terminal 46A is provided on at least one of the battery connector 46 of the first battery holder 44A and the battery connector 46 of the second battery holder 44B. In the second embodiment, the electric terminal 46A is provided on the battery connector 46 of the second battery holder 44B (refer to FIG. 6). The battery BT further includes a connector (not shown) electrically connected to the electric terminal 46A. In the second embodiment, the connector is provided on the second end BT2 of the battery BT.

The second wireless communication unit 50 is configured to transmit or receive a wireless signal. The second wireless communication unit 50 is provided on at least one of the battery holders 44. In the present embodiment, the second wireless communication unit 50 is provided on the first battery holder 44A. In one example, the second wireless communication unit 50 is electrically connected to a second controller 54 (refer to FIG. 7), which will be described later, by an electric wire (not shown). In one example, the second wireless communication unit 50 is electrically connected to the electric terminal 46A of the second battery holder 44B by an electric wire (not shown). The second wireless communication unit 50 is removably attached to the battery holder 44. That is, the second wireless communication unit 50 is removably attached to the first battery holder 44A. In a case where the second wireless communication unit 50 is removably attached to the battery holder 44, the attachment and removal of the second wireless communication unit 50 can be repeated since the battery holder 44 will practically not be damaged in a case where the second wireless communication unit 50 is removed from the battery holder 44. Therefore, the second wireless communication unit 50 can easily be replaced in a case where it fails to function properly. The second wireless communication unit 50 may be irremovably attached to the battery holder 44.

Figure 6:
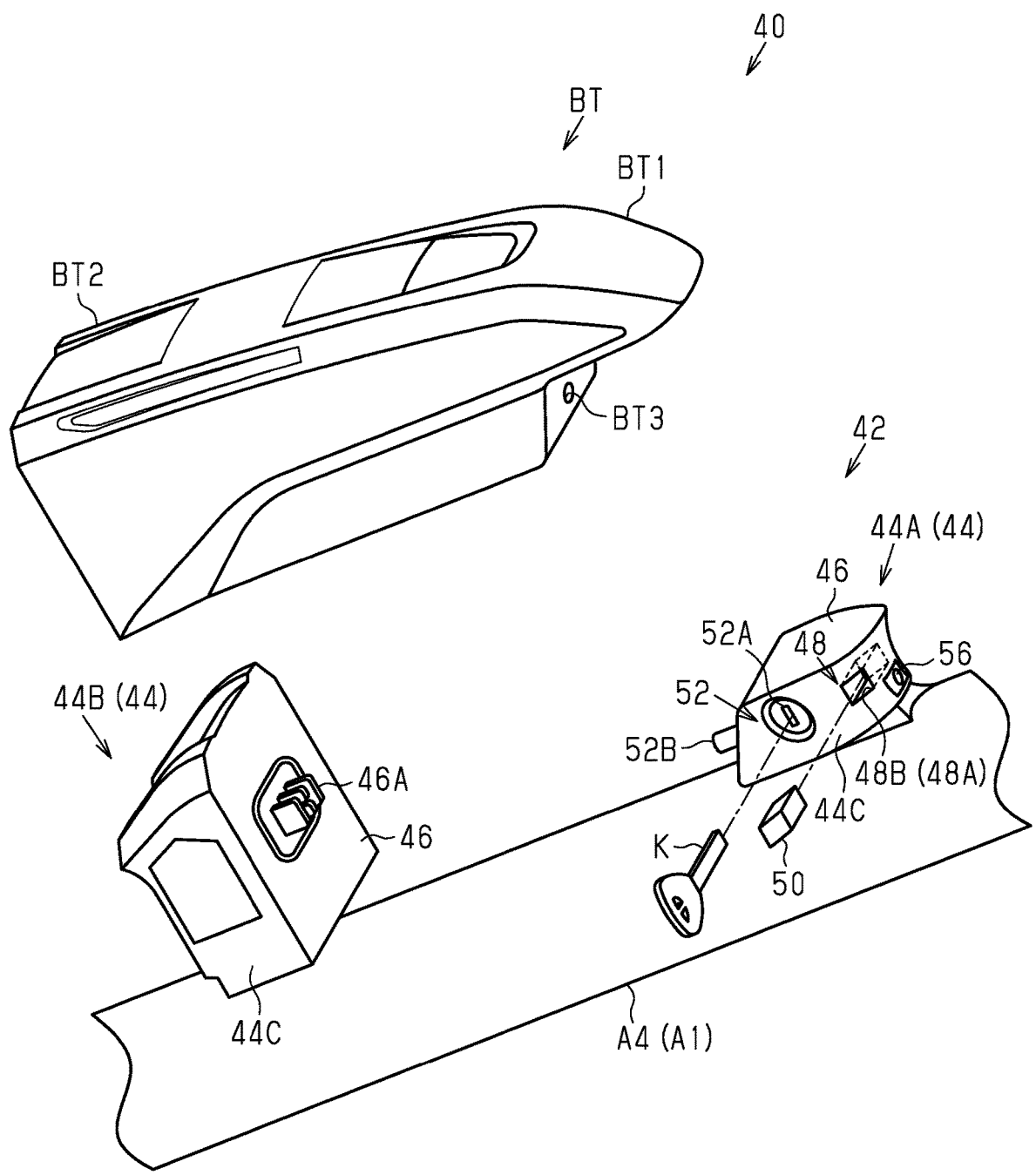
FIG. 6 is an exploded perspective view of the battery component illustrated in FIG. 5.

As shown in FIG. 6, the second wireless communication unit 50 is provided on the battery holder 44, for example, like in a sixth or seventh example described below. In the sixth example, at least part of the second wireless communication unit 50 is embedded in the battery holder 44. The battery holder 44 further includes a third mounting portion 48 that mounts the second wireless communication unit 50. That is, the second wireless communication unit 50 is mounted on the third mounting portion 48. The third mounting portion 48 is provided on a peripheral portion 44C of the battery holder 44. The battery holder 44 further includes a second recess 48A that is configured to receive at least part of the second wireless communication unit 50. The second recess 48A is included in the third mounting portion 48. The second recess 48A includes a through hole 48B. In this case, the second wireless communication unit 50 is positioned in the through hole 48B so as to be at least partially embedded in the battery holder 44. The third mounting portion 48 can further include a coupling tool (not shown) that is used to couple the second wireless communication unit 50 to the through hole 48B. In the seventh example, the second wireless communication unit 50 is integrated with the battery holder 44.

In the second embodiment, the second wireless communication unit 50 is arranged in the through hole 48B so as to be at least partially embedded in the battery holder 44, as described in the sixth example. The through hole 48B is provided in the first battery holder 44A. That is, the second wireless communication unit 50 is arranged in the through hole 48B so as to be at least partially embedded in the first battery holder 44A. For example, the second wireless communication unit 50 is arranged in the through hole 48B of the first battery holder 44A, for example, to be partially exposed to the outer side of the first battery holder 44A. In a state in which the second wireless communication unit 50 is arranged in the through hole 48B, the second wireless communication unit 50 is electrically connected to the second controller 54. The second wireless communication unit 50 can be provided on the second battery holder 44B.

The battery holding device 42 further includes a lock mechanism 52. The lock mechanism 52 is provided on the battery holder 44 and configured to restrict relative positions of the battery BT and the battery holder 44 in a state in which the battery BT is connected to the battery connector 46. In the second embodiment, the lock mechanism 52 is provided on the first battery holder 44A. The lock mechanism 52 includes a keyhole 52A. A key K is inserted into the keyhole 52A and operated to cancel the restriction on the relative positions of the battery BT and the battery holder 44. The keyhole 52A is provided on the peripheral portion 44C of the first battery holder 44A, for example, so as to be exposed to the outer side of the first battery holder 44A. In one example, the lock mechanism 52 further includes an engagement portion 52B configured to be selectively engaged with an engaged portion BT3 of the battery BT. The engaged portion BT3 is provided on the first end BT1 of the battery BT. The engagement portion 52B is either engaged with the engaged portion BT3 to restrict the relative positions of the battery BT and the battery holder 44, or disengaged from the engaged portion BT3 to cancel the restriction on the relative positions of the battery BT and the battery holder 44 in accordance with the operation of the key K inserted to the keyhole 52A. The lock mechanism 52 can be an electronic key (not shown) actuated in accordance with a wireless signal received by the second wireless communication unit 50. The lock mechanism 52 can be provided on the second battery holder 44B.

The battery holding device 42 further includes a second electric switch 56. The second electric switch 56 is provided on the battery holder 44 to feed a second controller 54 that controls a component CO installed on the human-powered vehicle A with an electric signal for activating the second controller 54. The second electric switch 56 is not included in, for example, a remote control device. In one example, the second electric switch 56 is electrically connected to the second controller 54 by an electric wire (not shown). In one example, the second electric switch 56 is electrically connected to the electric terminal 46A of the second battery holder 44B by an electric wire (not shown). The second electric switch 56 is configured to output an electric signal activating the second controller 54. In the present embodiment, the second electric switch 56 is provided in the first battery holder 44A. The second electric switch 56 can have substantially the same configuration as the first electric switch 14.

The second electric switch 56 is provided on, for example, the battery holder 44 like in an eighth or ninth example described below. In the eighth example, the second electric switch 56 is integrated with the battery holder 44. In the ninth example, the battery holder 44 includes a fourth mounting portion (not shown) allowing for mounting of the second electric switch 56. That is, the second electric switch 56 is mounted on the fourth mounting portion of the battery holder 44. The fourth mounting portion is provided on the peripheral portion 44C of the battery holder 44. The fourth mounting portion includes, for example, a recess, configured to receive the second electric switch 56, and a coupling tool (not shown), used to couple the second electric switch 56 to the recess. In the fourth mounting portion, the coupling tool may be omitted in a case where the second electric switch 56 is coupled to the recess through engagement of the second electric switch 56 and the recess. The second electric switch 56 and the second wireless communication unit 50 can be provided as a single unit on the battery holder 44.

In the present embodiment, the second electric switch 56 is formed integrally with the battery holder 44 as described above in the eighth example. That is, the second electric switch 56 is formed integrally with the first battery holder 44A. The second electric switch 56 is configured integrally with the first battery holder 44A so that, for example, at least part thereof is exposed to the outer side of the first battery holder 44A. The second electric switch 56 may be provided on the second battery holder 44B.

Figure 7:
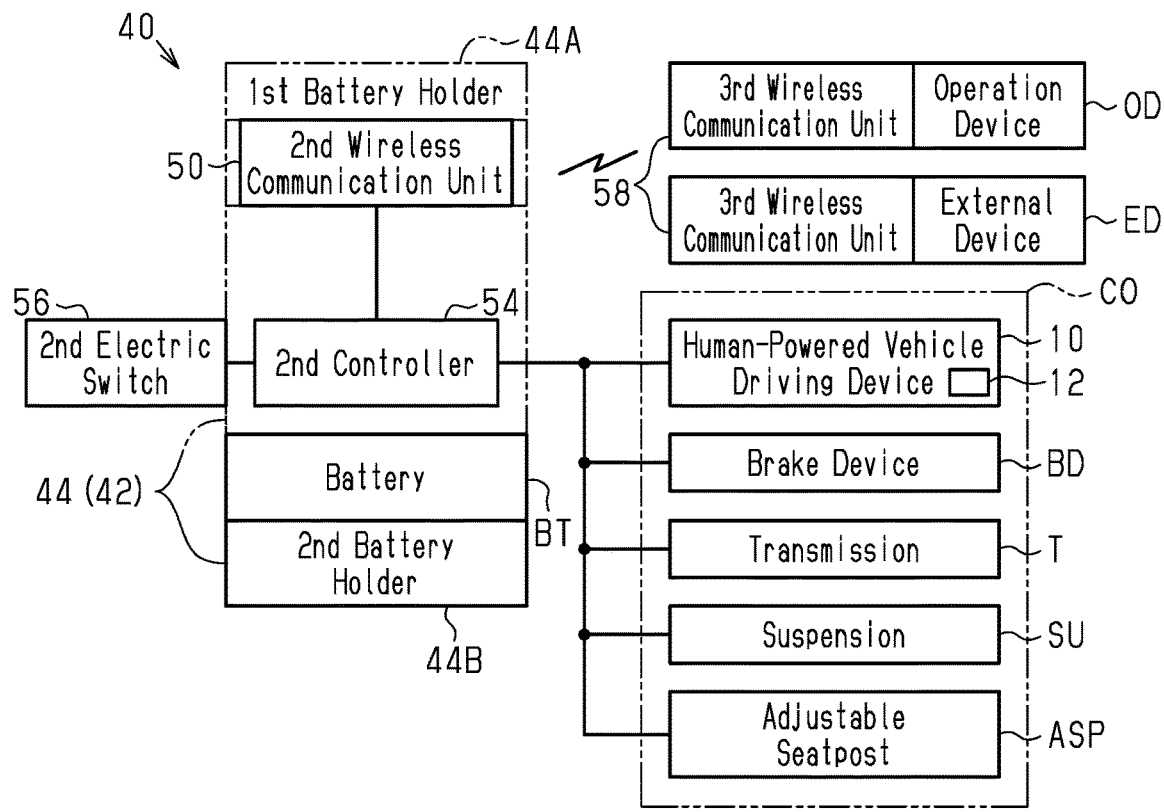
FIG. 7 is a block diagram showing the connection of the battery holding device illustrated in FIG. 5 with various elements.

As shown in FIG. 7, the second wireless communication unit 50 performs wireless communication with a third wireless communication unit 58, which is provided on at least one of an operation device OD, which is mounted on the human-powered vehicle A, and an external device ED. The operation device OD includes, for example, an operation device corresponding to any of various components CO. In one example, the operation device OD includes an operation device for driving the motor 12 of human-powered vehicle driving device 10. In this case, the operation device OD may be provided on the handlebar H or on the cycle computer SC. The external device ED includes at least one of a smart device and a personal computer (not shown). The smart device includes at least one of a wearable device such as a smart watch, a smartphone, and a tablet computer. In one example, the second wireless communication unit 50 receives a wireless signal transmitted from the third wireless communication unit 58 and transmits an electric signal corresponding to the received wireless signal to the second controller 54. The second wireless communication unit 50 can be configured to transmit a wireless signal that is in accordance with the operation of the second electric switch 56. Preferably, in this case, the second electric switch 56 is configured to output an electric signal for changing the control state of the motor 12.

The battery holding device 42 further includes a second controller 54 configured to control the component CO mounted on the human-powered vehicle A. The second controller 54 is a CPU or an MPU. The second controller 54 is accommodated in, for example, the battery holder 44. In the present embodiment, the second controller 54 is accommodated in the first battery holder 44A. In one example, the second controller 54 controls various components CO in accordance with electric signals acquired from the second wireless communication unit 50.

Modifications

The description related with the above embodiments exemplifies, without any intention to limit, an applicable form of a human-powered vehicle driving device and a battery holding device according to the present disclosure. In addition to the embodiments described above, the human-powered vehicle driving device and the battery holding device according to the present disclosure are applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

Figure 8:
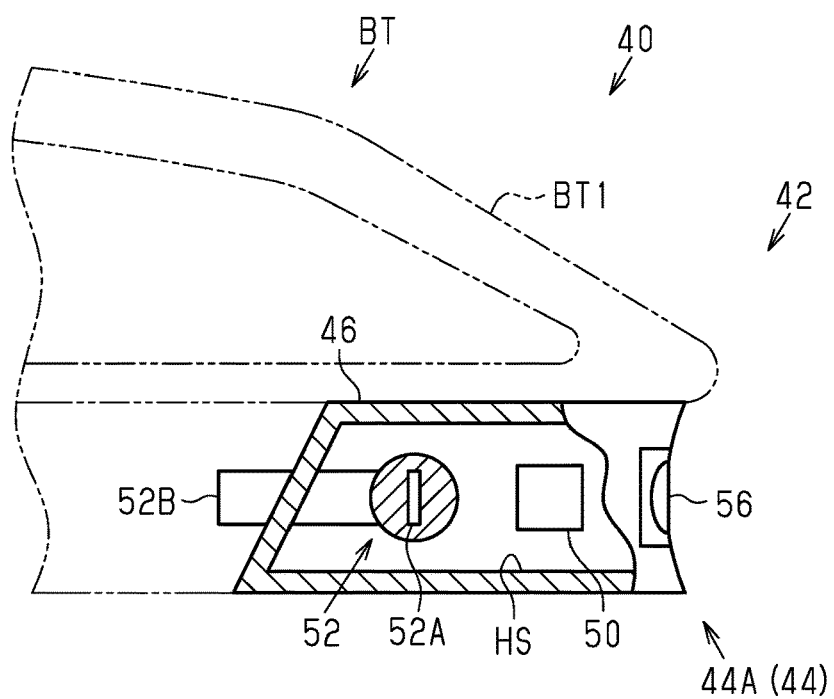
FIG. 8 is a schematic view cross sectional view of a part of a battery component in accordance with one modification.

The arrangement of the second wireless communication unit 50 can be changed in any manner. In one modification, as shown in FIG. 8, at least part of the second wireless communication unit 50 is embedded in the battery holder 44. The battery holder 44 includes an accommodation cavity HS therein. The second wireless communication unit 50 is arranged in the accommodation cavity HS. In this case, the second wireless communication unit 50 is arranged in the accommodation cavity HS so as to be entirely embedded in the battery holder 44. In the modification shown in FIG. 8, the accommodation cavity HS is provided in the first battery holder 44A. That is, the second wireless communication unit 50 is arranged in the accommodation cavity HS so as to be entirely embedded in the first battery holder 44A.

The configuration of the battery holder 44 can be changed in any manner. In the first example, one of the first battery holder 44A and the second battery holder 44B is omitted from the plurality of battery holders 44. In the second example, the battery holders 44 further include at least one battery holder (not shown) instead of or in addition to the first battery holder 44A and the second battery holder 44B.

The configuration of the battery holding device 42 can be changed in any manner. In the first example, at least one of the second wireless communication unit 50 and the second electric switch 56 is arranged in the second battery holder 44B. In the second example, the electric terminal 46A is arranged in the first battery holder 44A. In the third example, at least one of the second wireless communication unit 50 and the second electric switch 56 is arranged in the battery holders 44A and 44B in which the electric terminals 46A of the plurality of battery holders 44 are provided. In the fourth example, the lock mechanism 52 is positioned in the second battery holder 44B. In the fifth example, at least one of the lock mechanism 52, the second controller 54, and the second electric switch 56 is omitted from the battery holding device 42.

The configuration of the human-powered vehicle driving device 10 of the first embodiment can be changed in any manner. In one example, at least one of the first wireless communication unit 30 and the first controller 32 is omitted from the human-powered vehicle driving device 10.

The human-powered vehicle A can be of any type. In a first example, the human-powered vehicle A is a road bike, a mountain bike, a cross bike, a city cycle, a cargo bike, or a recumbent. In a second example, the human-powered vehicle A is a kick scooter.

What is claimed is:

1. A battery holding device comprising:
a battery holder configured to be mountable on a human-powered vehicle and including a battery connector connected to a battery, the battery holder including a first battery holder and a second battery holder spaced from the first battery holder in a longitudinal direction of a tube to which the battery holder attaches, the battery being removably attachable within the space so as to extend in the longitudinal direction;
a wireless communication unit provided on the battery holder;
a lock mechanism provided on the battery holder and that restricts relative positions of the battery and the battery holder in a state in which the battery is connected to the battery connector; and
an electric switch provided on the first battery holder on an outer surface opposite the space in the longitudinal direction and being separate from the lock mechanism, the electric switch configured to feed a controller that controls a component installed on the human-powered vehicle with an electric signal for activating the controller,
the battery connector being removably connected to the battery, and
the wireless communication unit being removably attached to the battery holder.

2. The battery holding device according to claim 1, wherein
the battery connector includes an electric terminal electrically connected to the battery.

3. The battery holding device according to claim 1, wherein
the wireless communication unit is provided on at least one of the first battery holder and the second battery holder.

4. The battery holding device according to claim 1, wherein
the battery includes a first end and a second end differing from the first end, and
the first battery holder is connected to at least part of the first end of the battery and the second battery holder is connected to at least part of the second end of the battery.

5. The battery holding device according to claim 1, wherein
at least part of the wireless communication unit is embedded in the battery holder.

6. The battery holding device according to claim 1, wherein
the battery holder further includes a recess configured to receive at least part of the wireless communication unit.

7. The battery holding device according to claim 6, wherein
the recess includes a through hole.

8. The battery holding device according to claim 1, wherein
the battery holder further includes an accommodation cavity therein, and
the wireless communication unit is arranged in the accommodation cavity.

9. The battery holding device according to claim 1, wherein
the wireless communication unit is a first wireless communication unit, and
the first wireless communication unit is configured to perform wireless communication with a second wireless communication unit provided on at least one of an operation device installed on the human-powered vehicle and an external device.

10. The battery holding device according to claim 1, wherein
the lock mechanism includes a keyhole that is configured to receive a key that is operated to cancel the restriction on the relative positions of the battery and the battery holder.

11. The battery holding device according to claim 1, wherein
the battery outputs power to drive a motor that assists in propulsion of the human-powered vehicle.

12. The battery holding device according to claim 1, wherein
the electric switch is configured to change a control state of a motor.

13. A battery holding device comprising:
a battery holder including a battery connector connected to a battery and configured to be mountable on a human-powered vehicle, the battery holder including a first battery holder and a second battery holder spaced from the first battery holder in a longitudinal direction of a tube to which the battery holder attaches, the battery being removably attachable within the space so as to extend in the longitudinal direction;
a wireless communication unit provided on the battery holder;
a lock mechanism provided on the battery holder and that restricts relative positions of the battery and the battery holder in a state in which the battery is connected to the battery connector; and
an electric switch provided on the first battery holder on an outer surface opposite the space in the longitudinal direction and being separate from the lock mechanism, the electric switch configured to feed a controller that controls a component installed on the human-powered vehicle with an electric signal for activating the controller,
the battery configured to output power to drive a motor that assists in propulsion of the human-powered vehicle.

14. The battery holding device according to claim 13, wherein at least part of the wireless communication unit is embedded in the battery holder.

15. The battery holding device according to claim 13, wherein
the wireless communication unit is a first wireless communication unit, and
the first wireless communication unit is configured to perform wireless communication with a second wireless communication unit provided on at least one of an operation device installed on the human-powered vehicle and an external device.

16. The battery holding device according to claim 13, wherein
the electric switch is configured to change a control state of the motor.

17. A battery holding device comprising:
a plurality of battery holders configured to be mountable on a human-powered vehicle and including a battery connector connected to a battery, the plurality of battery holders including a first battery holder and a second battery holder spaced from the first battery holder in a longitudinal direction of a tube to which the first battery holder and the second battery holder attach, the battery being removably attachable within the space so as to extend in the longitudinal direction;
a wireless communication unit provided on at least one of the plurality of battery holders;
a lock mechanism provided on at least one of the plurality of battery holders and that restricts relative positions of the battery and the at least one of the plurality of battery holders in a state in which the battery is connected to the battery connector; and
an electric switch provided on the first battery holder on an outer surface opposite the space in the longitudinal direction and being separate from the lock mechanism, the electric switch configured to feed a controller that controls a component installed on the human-powered vehicle with an electric signal for activating the controller,
the battery including a first end and a second end that differs from the first end, and
the first battery holder connected to at least part of the first end of the battery and the second battery holder connected to at least part of the second end of the battery.

18. The battery holding device according to claim 17, wherein
at least part of the wireless communication unit is embedded in the at least one of the plurality of battery holders.

19. The battery holding device according to claim 17, wherein
the wireless communication unit is a first wireless communication unit, and
the first wireless communication unit is configured to perform wireless communication with a second wireless communication unit provided on at least one of an operation device installed on the human-powered vehicle and an external device.

20. The battery holding device according to claim 17, wherein
the battery outputs power to drive a motor that assists in propulsion of the human-powered vehicle.

* * * * *